United States Patent [19]
Amari et al.

[11] Patent Number: 5,690,010
[45] Date of Patent: Nov. 25, 1997

[54] APPARATUS IN FORGING MACHINE TO CUT MATERIAL

[75] Inventors: Masahiko Amari, Nagoya; Michio Hayashi, Kasugai, both of Japan

[73] Assignee: Asahi Sumac Kabushiki Kaisha, Aichi-ken, Japan

[21] Appl. No.: 551,376

[22] Filed: Nov. 1, 1995

[30] Foreign Application Priority Data

Nov. 9, 1994 [JP] Japan .................... 6-301485

[51] Int. Cl.⁶ .................... B26D 5/08; B26D 7/02
[52] U.S. Cl. .................... 83/198; 83/111; 83/282; 83/34; 83/389; 83/459; 83/467.1; 83/616
[58] Field of Search .................... 83/129, 196, 198, 83/282, 389, 459, 465, 580, 111, 356.2, 383, 384, 388, 390, 391, 460, 467.1, 616

[56] References Cited

U.S. PATENT DOCUMENTS

| | | | |
|---|---|---|---|
| 3,093,023 | 6/1963 | Vail | 83/459 X |
| 3,099,182 | 7/1963 | Alverson | 83/459 X |
| 3,234,838 | 2/1966 | Faull | 83/465 X |
| 3,621,745 | 11/1971 | Cavalan et al. | 83/198 |
| 3,886,829 | 6/1975 | Criblez | 83/198 |
| 4,063,483 | 12/1977 | Kawaguchi et al. | 83/198 X |
| 4,516,322 | 5/1985 | Schlein | 83/580 X |
| 5,062,336 | 11/1991 | Elhaus | 83/198 |
| 5,123,829 | 6/1992 | Eason et al. | 83/465 X |

FOREIGN PATENT DOCUMENTS 1478845  3/1967  France .................... 83/465

*Primary Examiner*—Douglas D. Watts
*Assistant Examiner*—Clark F. Dexter
*Attorney, Agent, or Firm*—Emmanuel J. Lobato; Burns & Lobato, P.C.

[57] ABSTRACT

A shear die is axially divided into a pair of die portions 18,19 between which a holding cavity 22 is formed, wherein the holding cavity has a diameter that is less than that of material "a" so that when one of the die portions is forced against the other die portion under a biasing effect of a spring 25, the material will be firmly held in the die cavity ensuring that the material can be cut to a predetermined volume and present a smooth cut surface, and the cutter arbor 4 is provided with a releasing member 34 adapted to release the one die portion 19 from the effect of the spring 25 as the cutter arbor 4 is retracted to facilitate additional material being moved into the die cavity for a subsequent cutting operation.

2 Claims, 3 Drawing Sheets

APPARATUS IN FORGING MACHINE TO CUT MATERIAL

BACKGROUND OF THE INVENTION

1. Field of the Invention

The present invention relates to an apparatus in a forging machine such as a header to cut material to an exactly predetermined volume with a smooth cut surface.

2. Description of the Prior Art

In the conventional forging machine, material is fed through the hole of the shear die against the stopper and cut by the cutter being slidably advanced along the front surface of the shear die. However, the gap between the hole of the shear die and material prevents material from being reliably held, so an axial force tending to push material back into the hole of the shear die is exerted on material and makes it impossible to cut material to an exactly predetermined volume with a smooth cut surface.

Consequently, the forged product is inevitably defective with respect to its quality.

SUMMARY OF THE INVENTION

The above mentioned problem can be solved, according to the invention, by providing an improved arrangement that the shear die is axially divided into a pair of die portions between which a holding cavity is formed when one of these die portions is forced against the other die portion under a pressure generated by pressure generator means such as a spring, a pneumatic pressure source or a hydraulic pressure source, the holding cavity being partially diameter-reduced so as to have a diameter smaller than a diameter of material, and there is provided a releasing member adapted to release the one die portion from the pressure generated by the pressure generator means when the cutter arbor is retracted so that, with the cutter arbor being at its retracted position, the paired shear die portions may be separated from each other to feed material against the stopper and then the paired shear die portions may be forcibly joined together again under the effect of the pressure generator means to firmly hold material therebetween as the cutter begins to be advanced.

Such arrangement effectively eliminates an apprehension that material might be forced back into the shear die as the cutter cuts material and thereby allows material to be cut to an exactly predetermined volume with a desired smooth cut surface, consequently quality of the forged product is improved.

Preferably, the releasing member is provided on the cutter arbor so that material may be reliably released from the holding effect by the pressure of the pressure generator means as the cutter arbor is retracted.

Preferably, the cutter holder is telescopically combined with the cutter arbor for slidable back and forth movement relative to the cutter arbor so as to be normally biased rearward relative to the cutter arbor under a pressure of a spring as the pressure generator means and comes in engagement with a basic structure of the forging machine as the cutter arbor is retracted so that a gap is formed between an impact portion of the cutter holder and an impact portion of the cutter arbor before the cutter cuts material. In this manner, the cutter holder can be held against the basic structure of the forging machine under the spring pressure and material can be inserted into a bushing cutter before material is cut by this cutter. Furthermore, since there is a gap between the impact portion of the cutter holder and the cutter arbor, the cutter arbor starts to be moved and reaches velocity at which the impact portion of the cutter arbor runs against the impact portion of the cutter holder and causes the cutter to cut material.

In this way, material can be cut at a high velocity and so that a smoother cut surface can be achieved, consequently quality of the forged product is further improved.

DESCRIPTION OF THE PREFERRED EMBODIMENT

The invention will be described specifically with respect to an embodiment utilizing a spring as pressure generator means in reference with the accompanying drawings.

Figure 1:
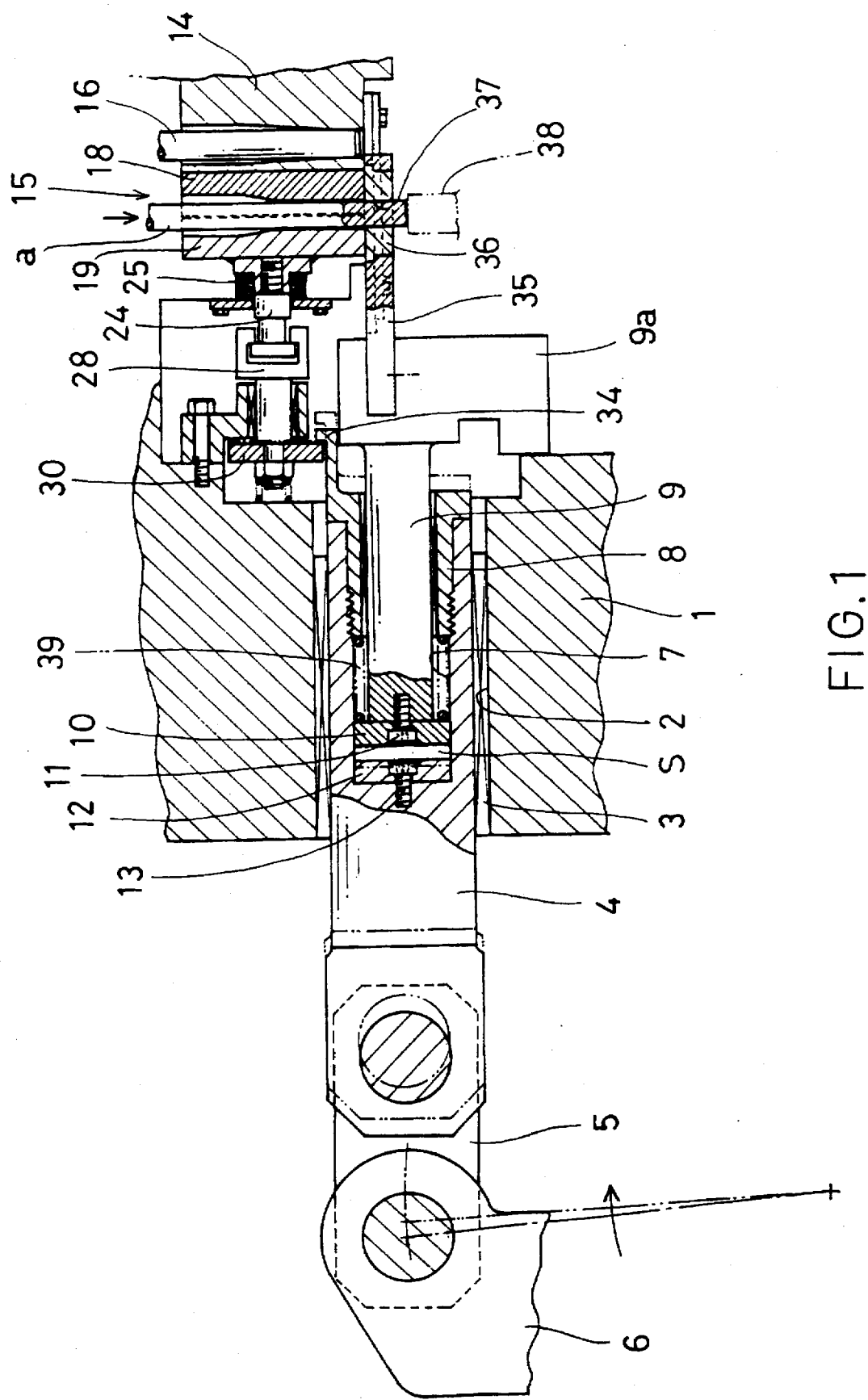
FIG. 1 is a sectional view showing an embodiment of the invention as before material a is cut.
Figure 2:
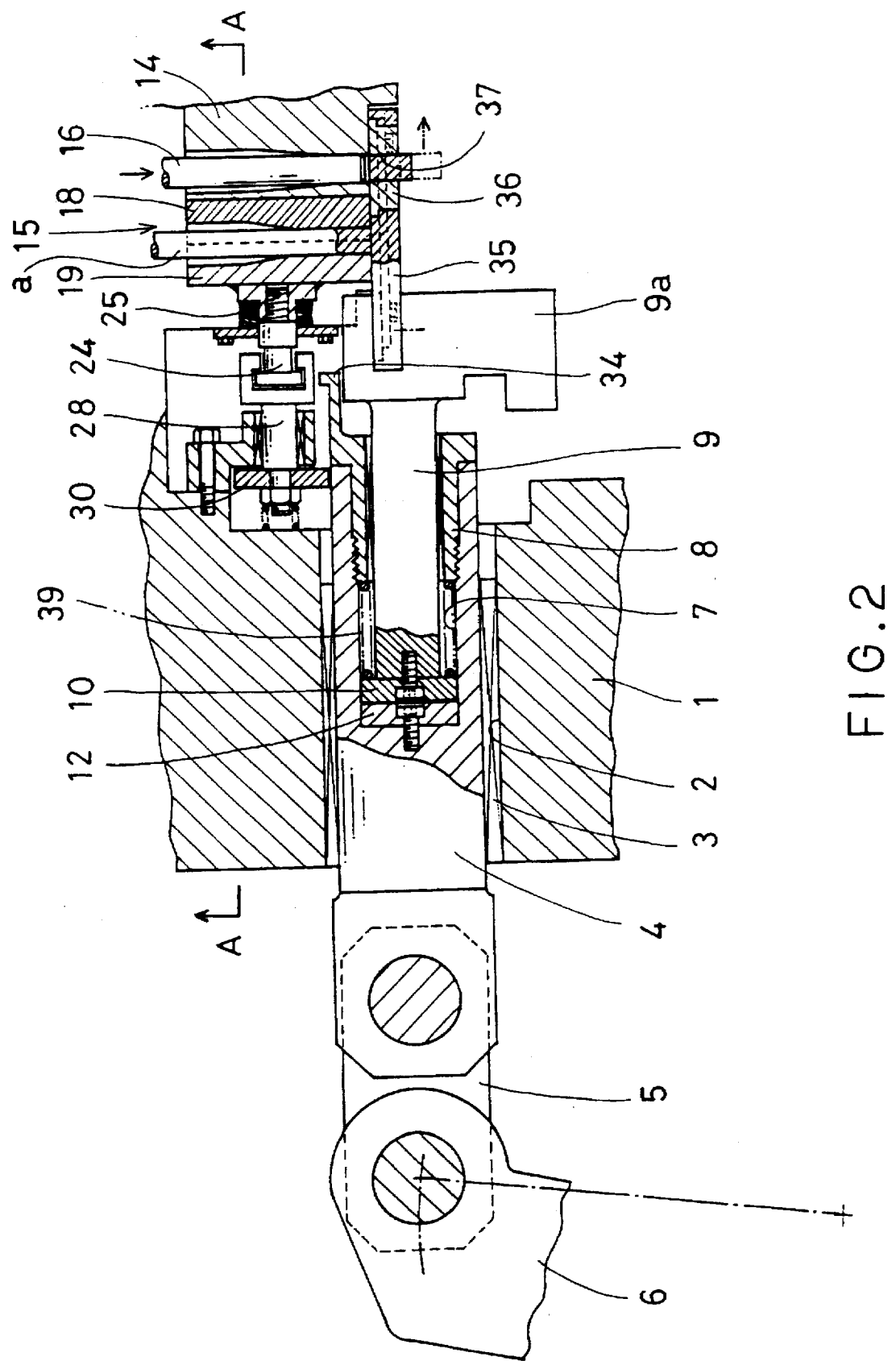
FIG. 2 is a view similar to FIG. 1 showing the same embodiment as after material a has been cut.

Referring to FIGS. 1 and 2, reference numeral 1 designates a basic structure of a forging machine formed with a slidable guiding cavity 2 through which a cutter arbor 4 is slidably guided with interposition of bushing 3. A base end of this cutter arbor 4 is connected by means of links 5, 6 to a cam (not shown) which is, in turn, rotated to drive the cutter arbor slidably back and forth.

The cutter arbor is provided at its forward end with a hole 7 and a cylindrical body 8 is threaded into a front end of said hole 7. A cutter holder 9 is slidably inserted into this cylindrical body 8 and provided at its rear end with a backplate 10 secured thereto by a screw 11. The cutter holder 9 is normally biased rearward under a resilient force of a coil spring 39 disposed between the cylindrical body 8 and the backplate 10, and a state in which a head 9a of the cutter holder 9 bears against an end surface of the basic structure 1 defines a rearmost and initial position of the cutter holder 9, at which a gap S is formed between a backplate 12 secured by a screw 13 to an innermost end of the hole 7 and the backplate 10 of the cutter holder 9.

The basic structure 1 of the forging machine carries, in front of the cutter holder 9, a die block 14 including a shear die 15 and an ejector pin 16 both set orthogonally to the direction in which the cutter holder 9 is moved back and forth.

The cutter holder 9 is provided at its forward end with a cutter plate 35 on which a bushing cutter 36 having a through-hole 37 adapted to be aligned with the center of the shear die 15 when the holder 9 is retracted to its rearmost position at which the head 9a of the cutter holder 9 bears against the basic structure 1.

Figure 3:
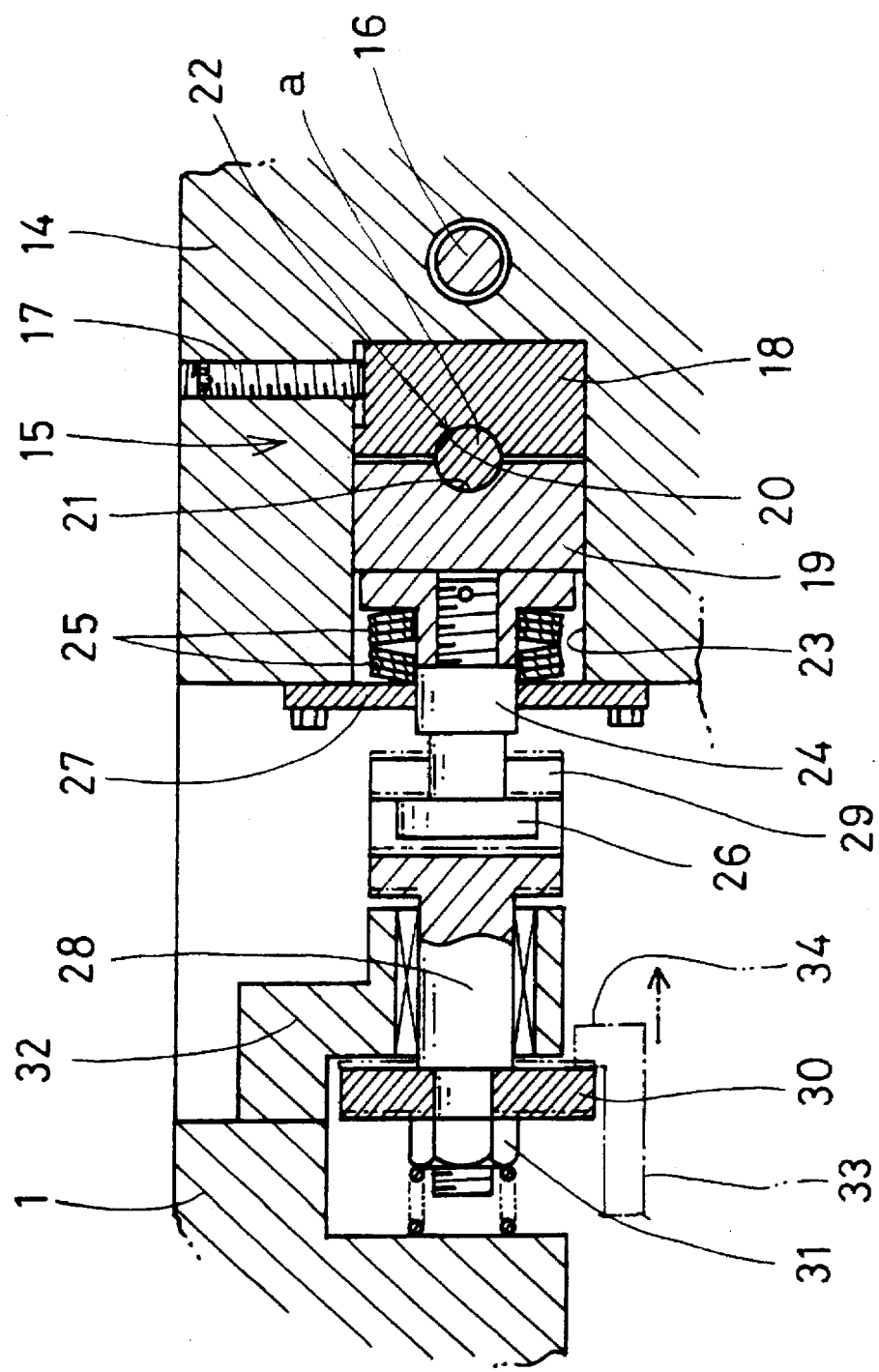
FIG. 3 is a sectional view taken along a line A—A in FIG. 2.

As shown in an enlarged scale by FIG. 3, the shear die 15 comprises a stationary die portion 18 fixed by a screw 17 to the die block 14 and a movable die portion 19 adapted to be slidably moved along a die guide groove 23 toward and away from said stationary die portion 18. Surfaces of these two die portions 18, 19 opposed to each other are formed with semicircular holding grooves 20, 21, respectively, which cooperate with each other to form a circular holding cavity 22 having a diameter slightly smaller than a diameter of the material a when these two die portions 18, 19 bear against each other.

The die guide groove 23 contains therein a pusher block 24 and a belleville spring 25 so that the belleville spring 25 is compressed by a cover plate 27 and its spring back force pushes the movable die portion 19 against the stationary die portion 18.

A bracket 32 fixed to the basic structure 1 of the forging machine slidably supports an actuator 28 which is provided at its forward end with a latch 29 adapted to be engaged with a collar 26 formed on a rear end of the pusher block 24, on one hand, and provided at its rear end with a disc 30 secured thereto by a nut 31, on the other hand.

An arm 33 extending forward from a forward end of the cylindrical body 8 threaded into the cutter arbor 4 is provided at its forward end with a hook-like release member 34 adapted to be engaged with the disc 30.

The present embodiment operates as follows:

As indicated by solid lines in FIG. 1, when the cutter arbor 4 comes to its rearmost position, the release member 34 comes in engagement with the disc 30 and pulls it rearward with a result that the actuator 28 and the pusher block 24 connected thereto are retracted against the spring back force of the belleville spring 25, so the movable die portion 19 is released from the force tending to bias this toward the stationary die portion 18.

As a result, material a is fed by a feeder (not shown) to pass through the holding cavity 22 and then the through-hole 37 of the bushing cutter 36 until it runs against the stopper 38.

As the cutter arbor 4 begins to be advanced, the release member 34 is also advanced and disengaged from the disc 30, as indicated by chain lines in FIG. 1. In a consequence, the movable die portion 19 is pushed against the stationary die portion 18 under the biasing force of the belleville spring 25 and the material a is firmly held between these two die portions 18, 19.

As the cutter arbor 4 is further advanced, the gap S between the cutter arbor 4 and the cutter holder 9 is eliminated, i.e.,the impact portions, specifically the backplates 10, 12, are run against each other as shown by FIG. 2. At the same time, the cutter holder 9 is advanced and causes the bushing cutter 36 to cut a portion of material a projecting out from the die. The portion of material a thus cut by the bushing cutter 36 is transferred to the front of the ejector pin 16, thereby ejected from the bushing cutter 36 and transported by finger means (not shown) to a forging station in order to be forged.

According to the embodiment as has been described and illustrated hereinabove, material a is firmly held by the shear die 15 and the cutter arbor 4 is accelerated before it runs against the cutter holder 9 and drives it to cut material a. Such arrangement allows material a to be cut to an exactly predetermined volume with a smooth cut surface and improves a precision of the forged product.

While the invention has been described with respect to the case in which the release member 34 is provided on the cutter arbor 4, it is also possible without departing from the scope of the invention to provide the release member 34 on any other member so far as this member is adapted to be operated synchronously with the cutter arbor 4.

We claim:

1. A machine for performing work on stock material including an apparatus for automatically cutting the stock material into individual lengths, said machine having a cutter arbor cyclically driven reciprocably along a given path wherein the cutter arbor moves forwardly in each cycle for cutting an individual length of the stock material and retracts rearwardly in each cycle after cutting an individual length of stock material;

said machine further having a cutter holder mounted on said cutter arbor and a cutter mounted on said cutter holder for cutting the individual length from the stock material in each cutting cycle, wherein the individual lengths are transferable for subsequent work to be performed by said machine said apparatus comprising:

a shear die for holding the stock material during successive cutting cycles while the individual lengths are being cut therefrom;

said shear die having two die portions comprising a stationary die portion and a movable die portion for jointly defining a die cavity for holding the stock material axially therein while the individual lengths are cut successively from the stock material;

said die cavity having a diameter for firmly clamping and holding the stock material during cutting;

biasing means for constantly applying a biasing force on the movable die portion toward the stationary die portion;

mounting means for slidably mounting the cutter holder on the cutter arbor and in an initial position such that an impact portion of the cutter holder is spaced relative to an impact portion of the cutter arbor in said given path when said cutter arbor is retracted for allowing the cutter arbor to subsequently travel forwardly and engage the cutter holder at said respective impact portions and to transport the cutter holder along therewith to effect cutting of the individual length of stock material in each cutting cycle after the cutter arbor reaches maximum velocity traveling forwardly, whereby the cutter is moved by said cutter arbor at a maximum velocity in each cutting cycle for cutting the individual lengths of stock material successively;

means for restoring said cutter holder to said initial position when the cutter arbor retracts in each cutting cycle so that said cutter holder is thereby ready for a next successive cutting of another individual length of the stock material; and release means on the cutter arbor for rendering the biasing means ineffective and separating the movable die portion from the stationary die portion when the cutter holder is fully retracted in each cutting cycle to open the die cavity for allowing advancing of the stock material in the cavity for cutting of a next successive length therefrom, and wherein said release means under control of the cutter arbor renders the biasing means effective for biasing the movable die portion toward the stationary die portion and jointly clamping the stock material when the cutter arbor starts to move forwardly for cutting of the stock material; whereby the stock material is held firmly for a next successive cutting of an individual length of the stock material.

2. The machine according to claim 1, in which said mounting means includes a blind bore in said cutter arbor which is open at one end and closed at an opposite end, said closed opposite end defining said impact portion of the cutter arbor; said cutter holder being slidably disposed axially in said bore, wherein said impact portion of the cutter holder is an axial end of the cutter holder which is maintained spaced from the closed end of the bore when the cutter arbor is fully retracted; the restoring means includes a spring biasing the cutter holder axially toward said closed end of the bore; and a projection on the cutter holder engages a surface on the machine when the cutter holder is in said initial position such that when the cutter arbor is traveling rearwardly, the projection arrests rearward travel of the cutter holder and allows the cutter arbor to fully retract and said cutter holder end to be spaced from the closed end of the bore and ready for a next successive cutting of an individual length of the stock material.

* * * * *